United States Patent
Nakane et al.

(10) Patent No.: US 6,928,888 B2
(45) Date of Patent: Aug. 16, 2005

(54) TORQUE SENSOR FOR DETECTING A SHAFT TORQUE

(75) Inventors: Naoki Nakane, Toyota (JP); Shigetoshi Fukaya, Toyota (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 10/674,411

(22) Filed: Oct. 1, 2003

(65) Prior Publication Data

US 2004/0074314 A1 Apr. 22, 2004

(30) Foreign Application Priority Data

Oct. 2, 2002 (JP) .......................................... 2002-290307

(51) Int. Cl.[7] .................................................. G01L 3/02
(52) U.S. Cl. .................................................. 73/862.332
(58) Field of Search ........................ 73/862.332, 862.33, 73/862.331, 862.333, 862.334

(56) References Cited

U.S. PATENT DOCUMENTS

| | | | |
|---|---|---|---|
| 4,784,002 A | | 11/1988 | Io |
| 4,984,474 A | | 1/1991 | Matsushima et al. |
| 5,705,756 A | * | 1/1998 | LeMarquand et al. . 73/862.332 |
| 6,476,600 B2 | * | 11/2002 | Kono et al. ............... 324/207.2 |
| 6,483,296 B1 | * | 11/2002 | Hamaoka et al. ...... 324/207.25 |
| 6,581,479 B2 | * | 6/2003 | Goto et al. ............ 73/862.331 |
| 2002/0189371 A1 | | 12/2002 | Nakane et al. |

FOREIGN PATENT DOCUMENTS

| | | |
|---|---|---|
| JP | 2613449 | 2/1997 |
| JP | 2003-149062 | 5/2003 |
| WO | WO 02/071019 A1 | 9/2002 |

* cited by examiner

*Primary Examiner*—Max Noori
(74) *Attorney, Agent, or Firm*—Posz Law Group, PLC (57) ABSTRACT

A first shaft and a second shaft are connected coaxially. A torsion bar converts a torque applied between two shafts into a torsion displacement. A multipolar magnet is fixed to the first shaft. One set of magnetic yokes is fixed to the second shaft and disposed in a magnetic field generated by the multipolar magnet. The magnetic yokes are opposed to each other via an air gap in an axial direction. A magnetic sensor is provided for detecting the density of magnetic flux generated in the air gap. A non-magnetic spacer is disposed between the magnetic yokes as a means for positioning the magnetic yokes. The spacer and the magnetic yokes are integrated by resin molding.

8 Claims, 11 Drawing Sheets

TORQUE SENSOR FOR DETECTING A SHAFT TORQUE

BACKGROUND OF THE INVENTION

This invention relates to a torque sensor detecting a shaft torque applied to a rotary shaft as change of magnetic flux density (i.e., strength of magnetic field).

As a conventional technique, Japanese Patent Application Laid-open No. 2003-149062 (FIG. 13) discloses a torque sensor.

Figure 13:
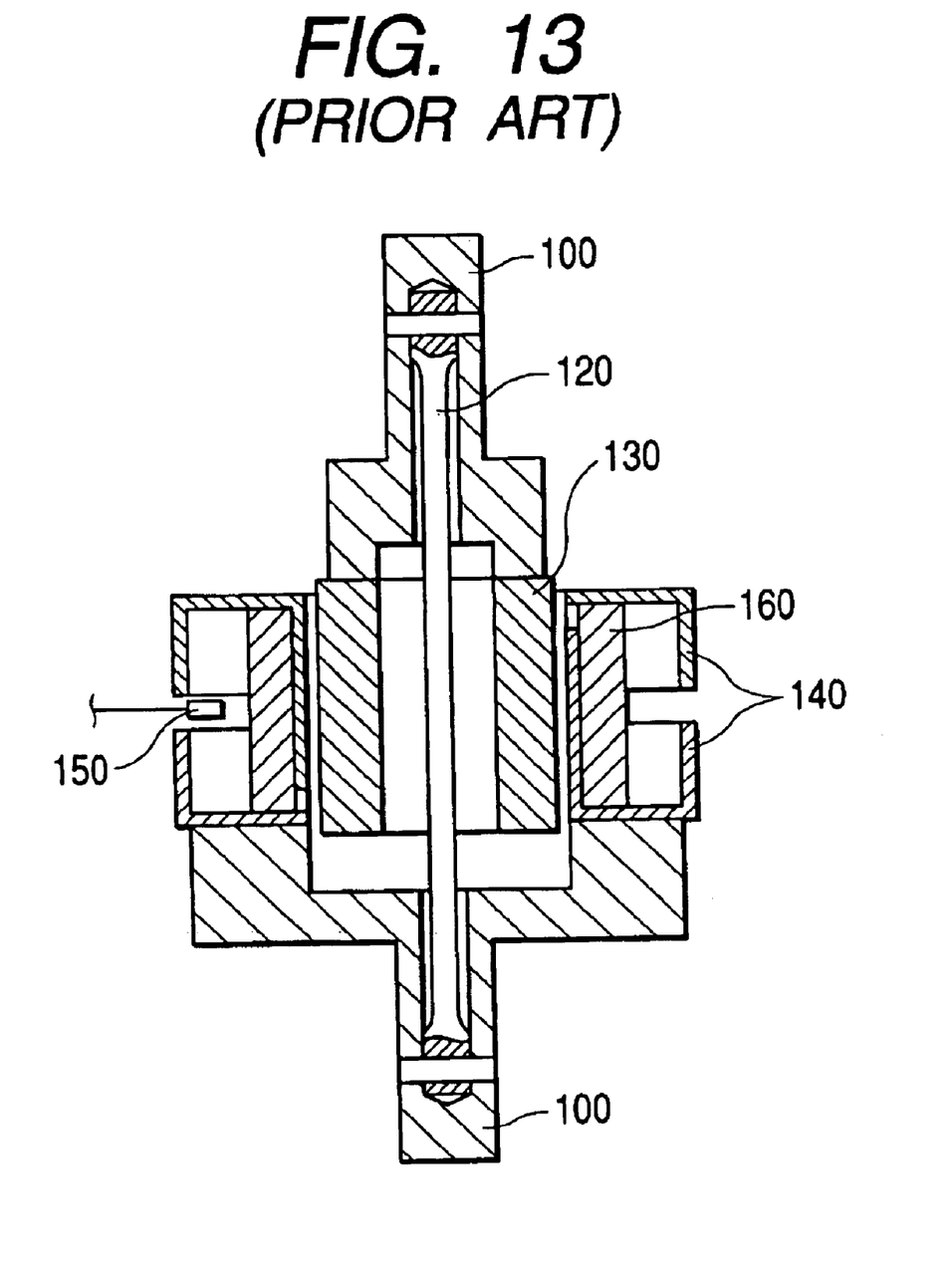
FIG. 13 is a cross-sectional view showing an overall arrangement of a conventional torque sensor.

According to this torque sensor, as shown in FIG. 13, a first shaft 100 and a second shaft 110 are coaxially connected by a torsion bar 120. A multipolar magnet 130 is fixed to the first shaft 100 (or one end of the torsion bar 120). One set of magnetic yokes 140, fixed to the second shaft 110 (or the other end of the torsion bar 120), is disposed in a magnetic field generated from the multipolar magnet 130. The magnetic yokes 140 are opposed to each other via an air gap in the axial direction. A magnetic sensor 150 detects the density of magnetic flux generated in the air gap.

Each of the magnetic yokes 140 has a plurality of claw poles disposed at equal pitches in the circumferential direction. The claw poles of respective magnetic yokes 140 are spaced with a predetermined air gap in the axial direction and are angularly offset from each other by a half pitch in the circumferential direction.

The magnetic yokes 140 and the multipolar magnet 130 are disposed in such a manner that the center of each claw pole of the magnetic yokes 140 agrees with a magnetized boundary line (i.e., a boundary between N-pole and S-pole), to obtain a neutral point where the output (voltage) of magnetic sensor 150 becomes zero in the condition that the torsion bar 120 causes no torsion (i.e., when no torque is applied to the torsion bar 120).

The above-described prior art document discloses a fixing portion 160 used for positioning the set of magnetic yokes 140. However, the detailed arrangement of fixing portion 160 is not disclosed and accordingly it is not apparent how the magnetic yokes 140 are positioned (especially, in the circumferential direction). Furthermore, it is not clear how the condition of magnetic yokes 140 positioned by the fixing portion 160 is retained.

SUMMARY OF THE INVENTION

In view of the above-described problems, the present invention has an object to provide a torque sensor which is capable of surely and easily positioning one set of magnetic yokes and is also capable of surely retaining the positioning condition.

In order to accomplish the above and other related objects, the present invention provides a first torque sensor including a first shaft and a second shaft connected coaxially, a torsion bar converting a torque applied between the first shaft and the second shaft into a torsion displacement, and a multipolar magnet fixed to the first shaft or to one end of the torsion bar. One set of magnetic yokes is fixed to the second shaft or to the other end of the torsion bar and disposed in a magnetic field generated by the multipolar magnet. The magnetic yokes are opposed to each other via an air gap in an axial direction. And, a magnetic sensor is provided for detecting the density of magnetic flux generated in the air gap. Furthermore, a non-magnetic spacer is disposed between the magnetic yokes as a means for positioning the coupled magnetic yokes. And, the spacer and the coupled magnetic yokes are integrated by resin molding.

According to this arrangement, the spacer is used for positioning one set of magnetic yokes. The spacer and the magnetic yokes are integrated together by resin molding. Thus, it becomes possible to surely retain the coupled condition of the magnetic yokes being thus positioned.

Preferably, the magnetic yokes have a plurality of claw poles disposed in a circumferential direction at equal intervals. The spacer retains the magnetic yokes with a predetermined gap in the axial direction and has at least one projection provided at each axial end surface thereof. The projection is disposed between the claw poles neighboring with each other in the circumferential direction of the magnetic yoke, so that the coupled magnetic yokes are positioned in the circumferential direction.

According to this arrangement, the height (i.e., the length in the axial direction) of the spacer accurately regulates the distance between two magnetic yokes in the axial direction to provide the air gap of a predetermined length.

Furthermore, the projection provided on the spacer is engaged with the claw poles of the magnetic yoke. The projection prevents respective magnetic yokes from shifting relative to the spacer in the circumferential direction. Accordingly, by providing at least one projection on each end surface of the spacer and disposing this projection between the claw poles neighboring with each other in the circumferential direction of the magnetic yoke, it becomes possible to accurately position one set of the magnetic yokes in the circumferential direction.

Preferably, the magnetic sensor is constituted by two separated sensors which are disposed in parallel with each other with respect to the direction of magnetic flux and have magnetism detecting directions mutually opposed by an angular difference of 180°.

According to this arrangement, two magnetic sensors can produce symmetric outputs realizing crossing characteristics. Thus, it becomes possible to cancel temperature drift by taking a difference between the outputs of two magnetic sensors. Furthermore, the detectable physical amount is doubled. The detection sensitivity can be improved. The performance of torque sensor can be improved.

Furthermore, the present invention provides a second torque sensor including a first shaft and a second shaft connected coaxially, a torsion bar converting a torque applied between the first shaft and the second shaft into a torsion displacement, and a multipolar magnet fixed to the first shaft or to one end of the torsion bar. One set of magnetic yokes is fixed to the second shaft or to the other end of the torsion bar and disposed in a magnetic field generated by the multipolar magnet. The magnetic yokes are opposed to each other via an air gap in an axial direction. And, a magnetic sensor is provided for detecting the density of magnetic flux generated in the air gap. According to the second torque sensor, a non-magnetic spacer is provided to retain the coupled magnetic yokes with a predetermined gap in the axial direction. The spacer has at least one projection provided at each axial end surface thereof. The projection is disposed between claw poles neighboring with each other in the circumferential direction of the magnetic yoke. And, the spacer and the coupled magnetic yokes are integrated by resin molding.

According to this arrangement, the claw poles of the magnetic yokes are surely engaged with the projections provided on the spacer. Thus, it becomes possible to prevent the magnetic yokes from shifting relative to the spacer in the circumferential direction. Accordingly, by providing at least one projection on each end surface of the spacer and disposing this projection between the claw poles neighboring with each other in the circumferential direction of the magnetic yoke, it becomes possible to accurately position one set of magnetic yokes in the circumferential direction. Furthermore, the coupled magnetic yokes and the spacer are integrated by resin molding. Thus, it becomes possible to surely retain the coupled condition of the magnetic yokes being thus positioned.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Preferred embodiment of the present invention will be explained hereinafter with reference to attached drawings.

First Embodiment

Figure 1:
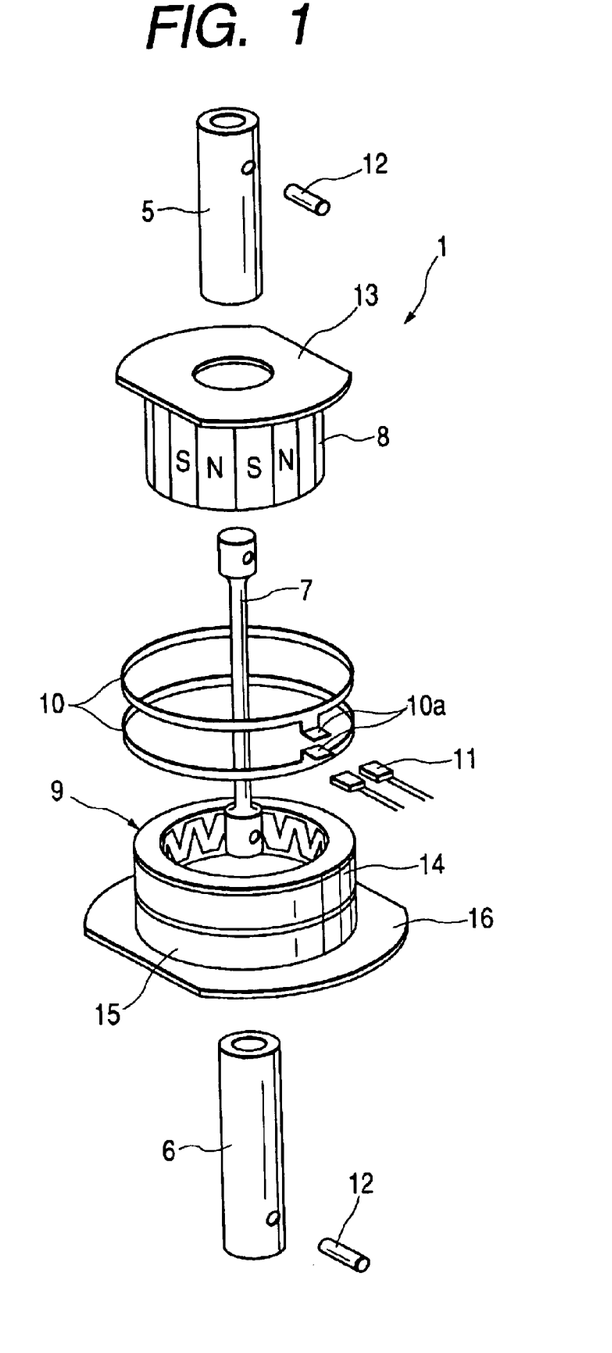
FIG. 1 is an exploded perspective view showing a torque sensor in accordance with a first embodiment of the present invention.
Figure 9:
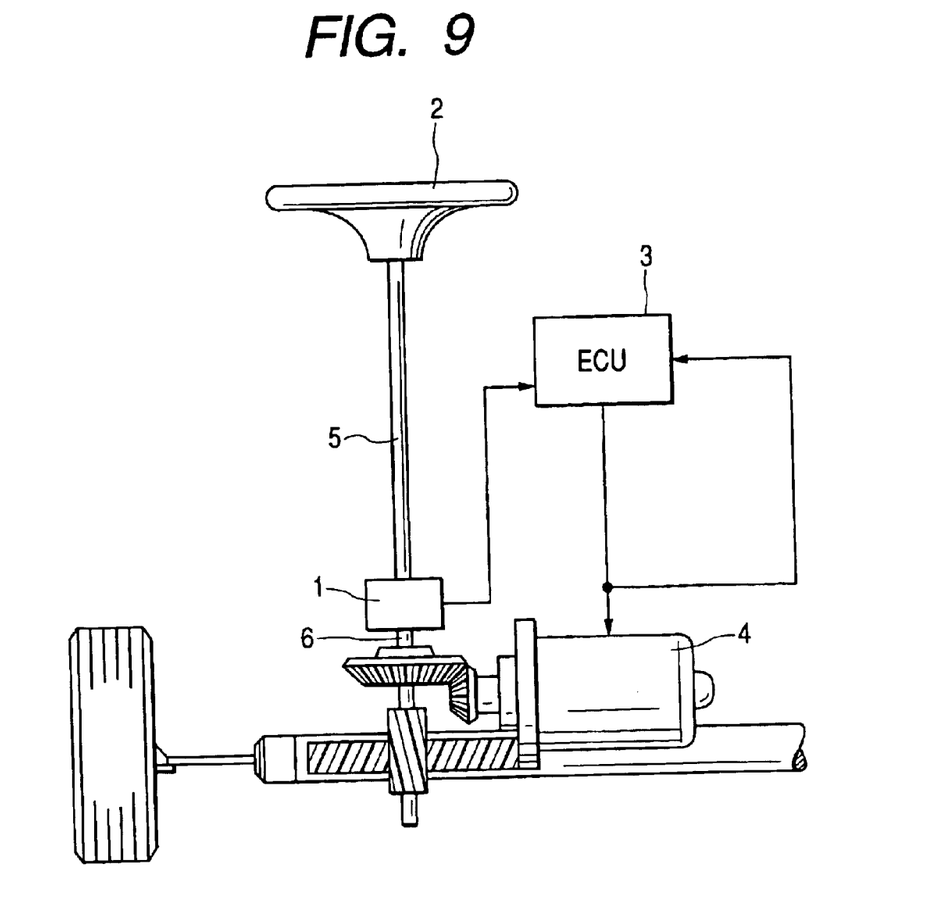
FIG. 9 is a schematic view showing an overall arrangement of a motor-driven power steering apparatus.

FIG. 1 is an exploded perspective view showing a torque sensor 1 in accordance with a preferred embodiment of the present invention. For example, the torque sensor 1 of this embodiment is used for a motor-driven power steering apparatus shown in FIG. 9. The torque sensor 1 detects a steering force (i.e., a shaft torque) of a steering wheel 2, and sends the detected steering force to an ECU (electronic control unit) 3. The ECU 3 controls the output of a motor-driven motor 4 in accordance with the steering force detected by the torque sensor 1.

The torque sensor 1 is provided between an input shaft 5 and an output shaft 6 which cooperatively constitute a steering shaft. As shown in FIG. 1, the torque sensor 1 includes a torsion bar 7, a multipolar magnet 8, one set of magnetic yokes 9, one set of flux collecting rings 10, and a magnetic sensor 11.

Figure 2:
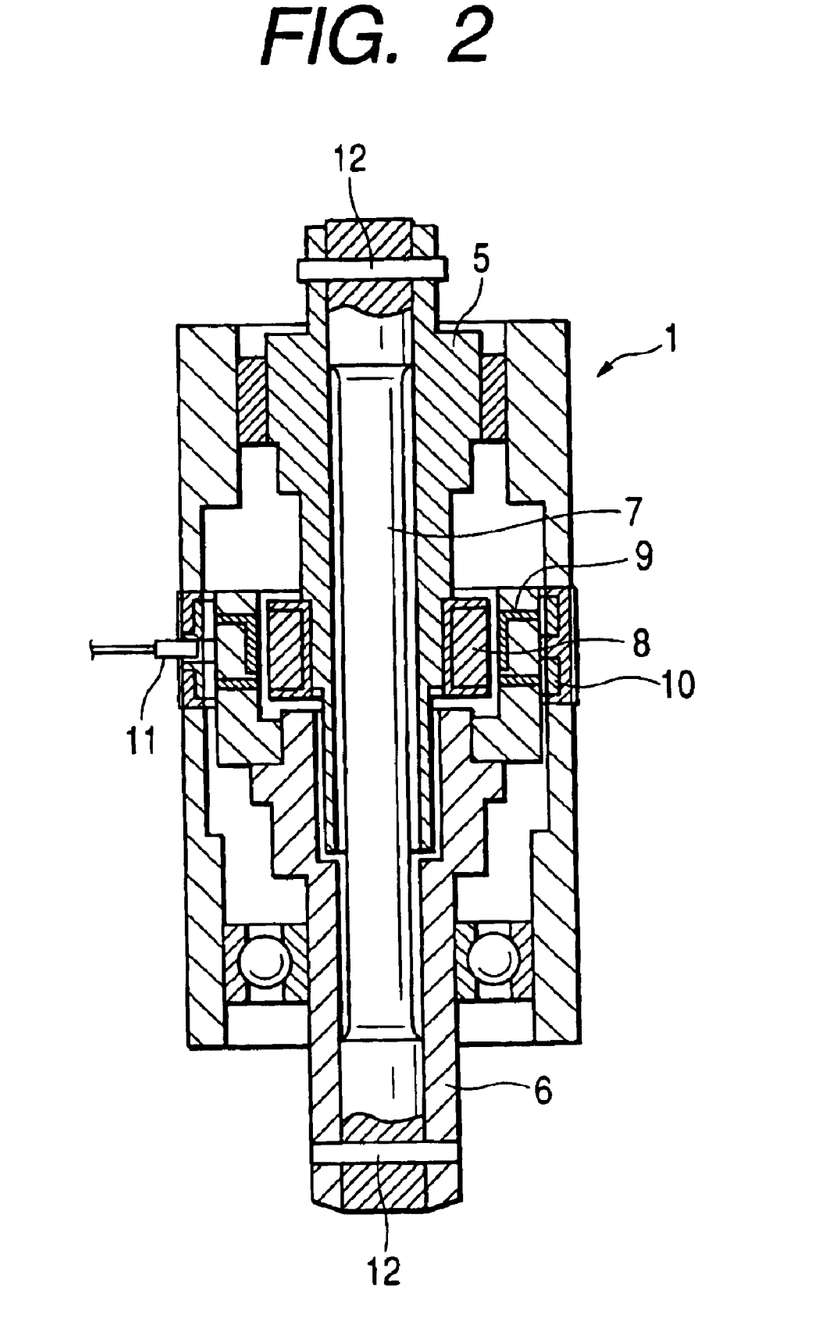
FIG. 2 is a cross-sectional view showing an overall arrangement of the torque sensor in accordance with the first embodiment of the present invention.

As shown in FIG. 2, the torsion bar 7 is an elastic rod member having one end connected to the input shaft 5 via a pin 12 and the other end connected to the output shaft 6 via a pin 12. When a steering torque is applied on the steering shaft, the torsion bar 7 causes a torsion or twist displacement in accordance with the largeness of the applied steering torque.

The multipolar magnet 8 has a ring shape magnetized into alternate N-poles and S-poles arranged in a circumferential direction. A collar 13 is integrated with the multipolar magnet 8 (refer to FIG. 1). The multipolar magnet 8 is press-fitted to the input shaft 5 (or the output shaft 6) via the collar 13.

Figure 3A:
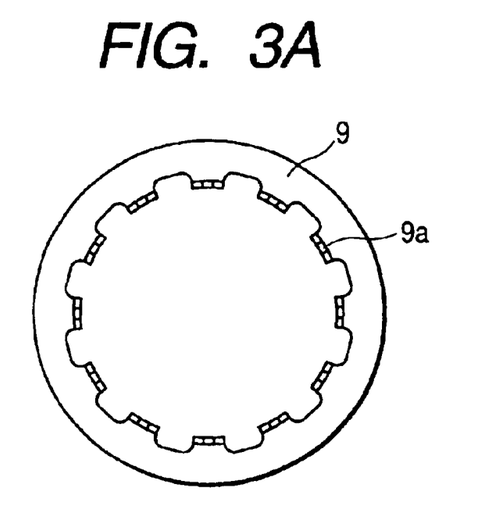
FIG. 3A is a plan view showing a magnetic yoke in accordance with the first embodiment of the present invention.
Figure 3B:
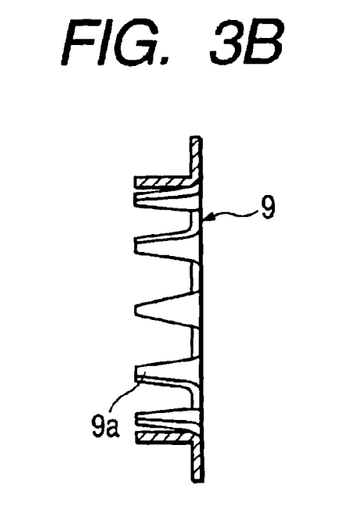
FIG. 3B is a side view showing the magnetic yoke in accordance with the first embodiment of the present invention.

Each of the magnetic yoke 9 is made of a soft magnetic material and, as shown in FIGS. 3A and 3B, has a plurality of claw poles 9a arranged in the circumferential direction at equal intervals.

Figure 4:
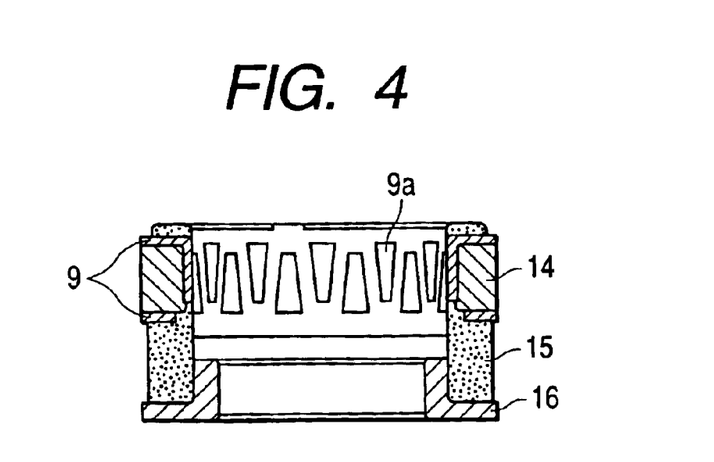
FIG. 4 is a cross-sectional view showing one set of magnetic yokes positioned by a spacer and integrated by resin molding in accordance with the first embodiment of the present invention.

As shown in FIG. 4, two magnetic yokes 9 are coupled as one set of magnetic yokes. A spacer 14, intervening between the coupled magnetic yokes 9, has a function of positioning the magnetic yokes 9 in the assembled condition. The magnetic yokes 9 and the spacer 14 are integrated by a molding resin 15. One set of magnetic yokes 9 being thus assembled is press-fitted to the output shaft 6 (or the input shaft 5) via a collar 16 fixed to the molding resin 15.

Figure 5:
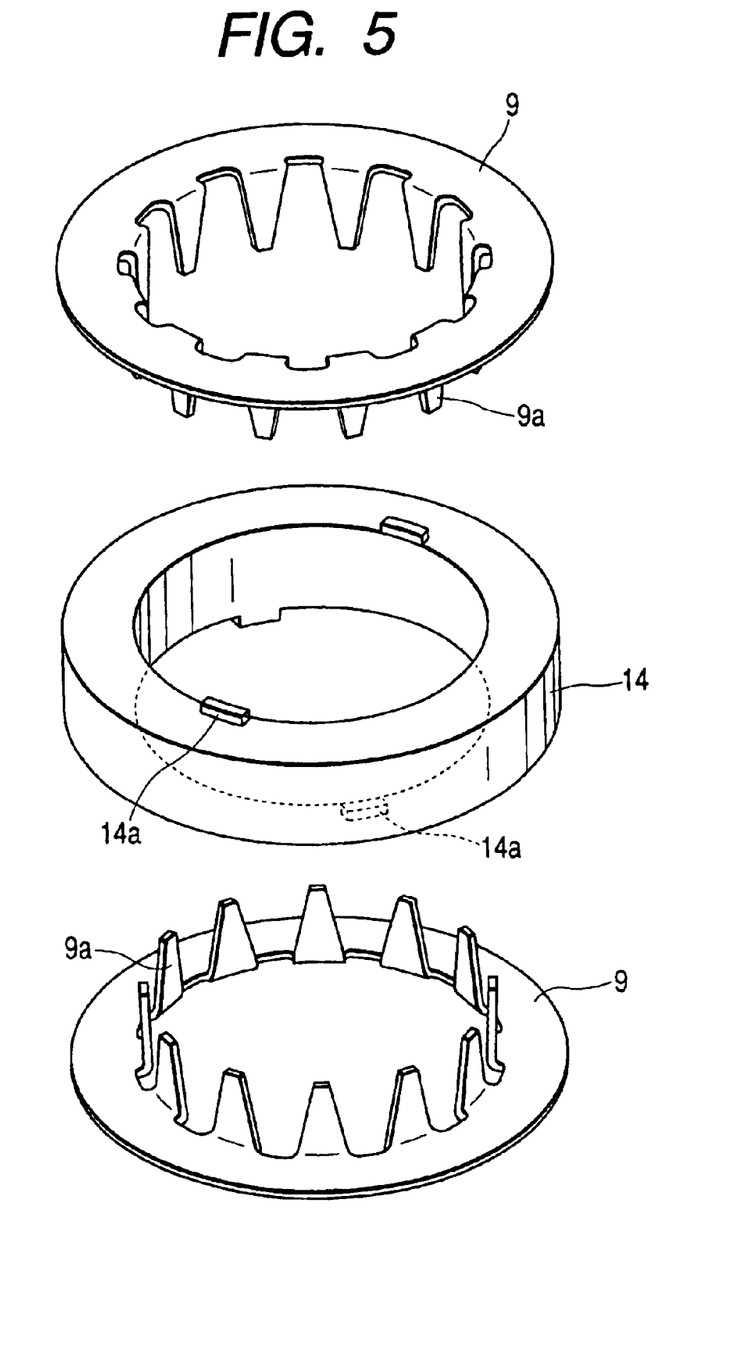
FIG. 5 is a perspective view showing the magnetic yokes and the spacer in accordance with the first embodiment of the present invention.
Figure 6A:
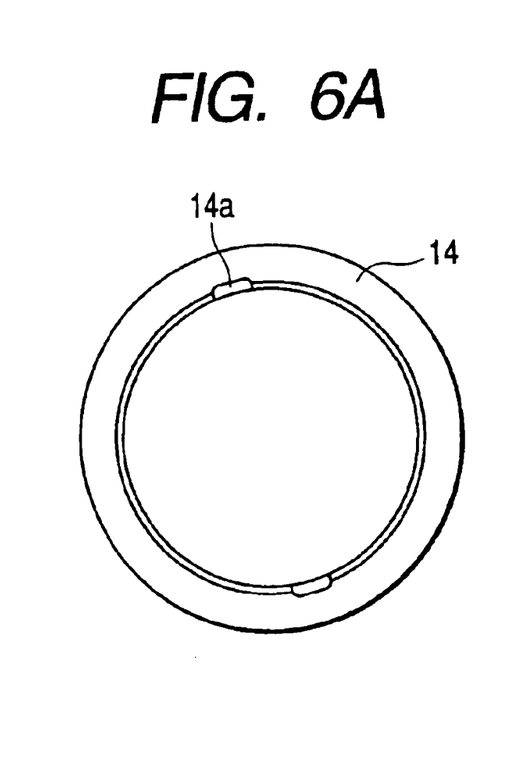
FIG. 6A is a plan view showing one surface of the spacer in accordance with the first embodiment of the present invention.
Figure 6B:
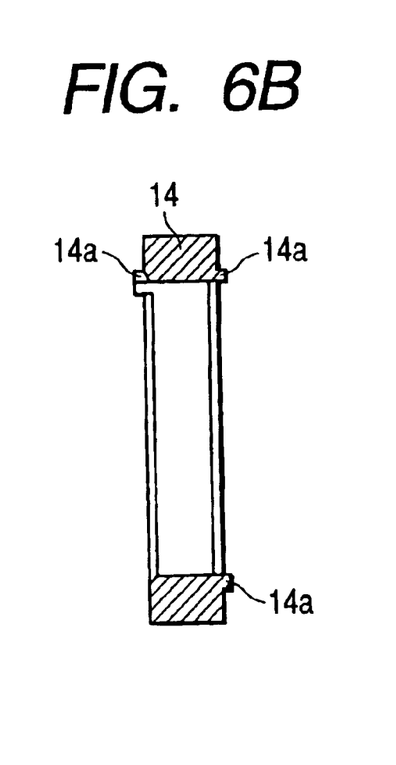
FIG. 6B is a cross-sectional view showing the spacer in accordance with the first embodiment of the present invention.
Figure 6C:
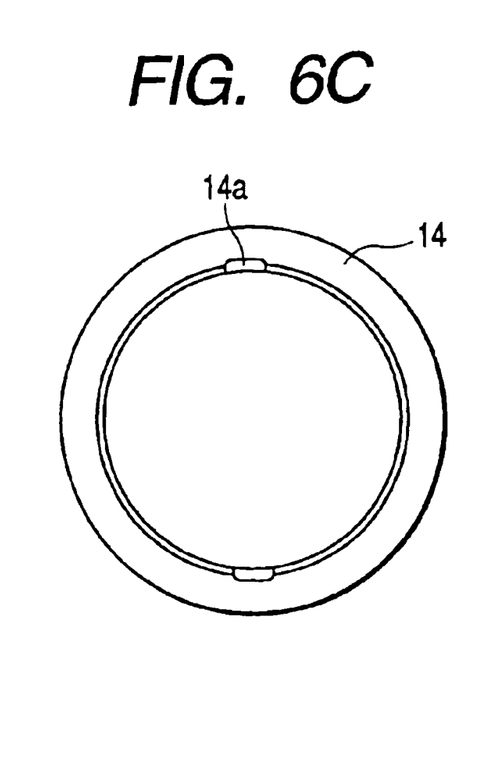
FIG. 6C is a plan view showing the other surface of the spacer in accordance with the first embodiment of the present invention.
Figure 7A:
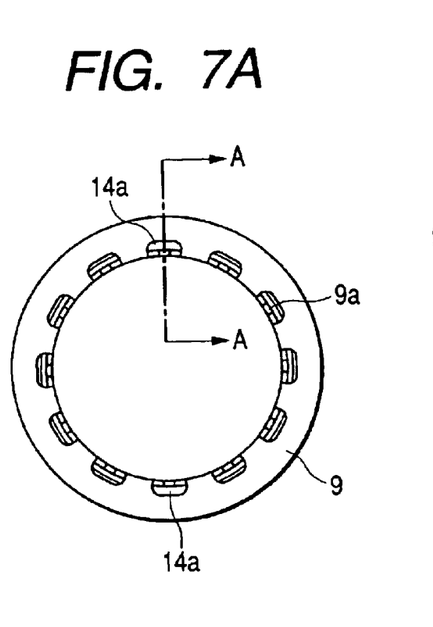
FIG. 7A is a plan view showing the magnetic yokes assembled via the spacer in accordance with the first embodiment of the present invention.
Figure 7B:
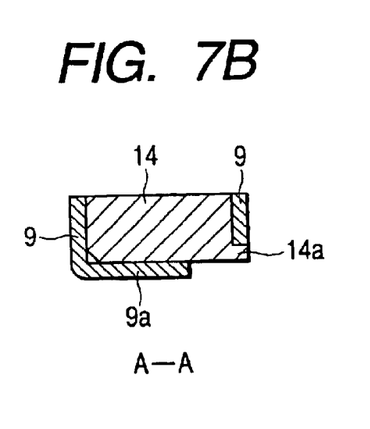
FIG. 7B is a cross-sectional view taken along a line A—A of FIG. 7A.

The spacer 14 is formed by a non-magnetic material and, as shown in FIG. 5, has a ring shape having a predetermined height in the axial direction. The spacer 14 has two projections 14a provided at each axial end surface thereof. Two projections 14a are provided at an inner peripheral end of the spacer 14 so as to be opposed in the radial direction as shown in FIGS. 6A to 6C. The projection 14a provided on one end surface (refer to FIG. 6A) is offset from the projection 14a provided on the other end surface (refer to FIG. 6C) in the circumferential direction by an angle equivalent to a ½ pitch of claw pole 9a. The ½ pitch of claw pole 9a is equal to a half of the distance (i.e., 1 pitch) between the centers of claw poles 9a neighboring with each other in the circumferential direction.

As shown in FIG. 5, two magnetic yokes 9 are assembled to the spacer 14 from both sides thereof. The projections 14a of the spacer 14 are coupled into the clearances between the claw poles 9a neighboring with each other in the circumferential direction. With this assembling, an angular offset equivalent to ½ pitch in the circumferential direction is kept between the coupled magnetic yokes 9 so that their claw poles 9a are alternately meshed with each other.

Figure 8A:
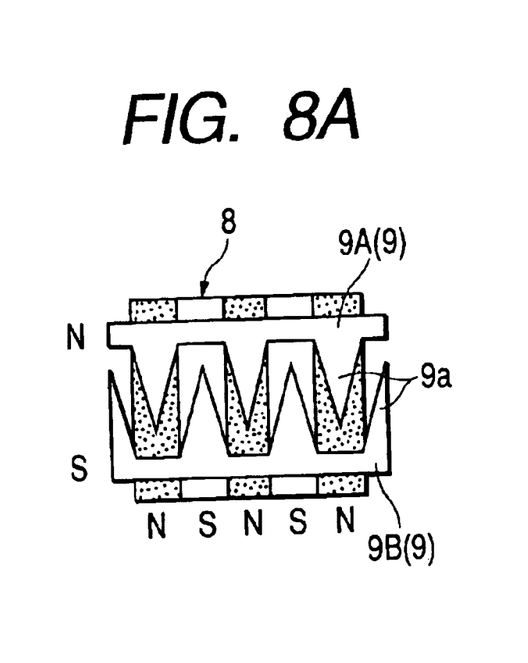
FIGS. 8A to 8C are views explaining the operation of the torque sensor in accordance with the first embodiment of the present invention.
Figure 8B:
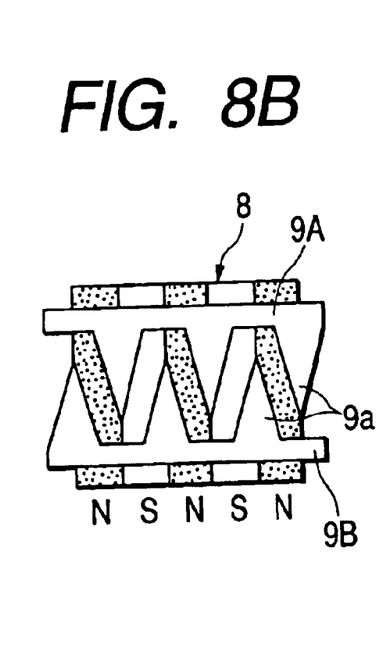

The multipolar magnet 8 and the assembled magnetic yokes 9 are disposed in such a manner that the center of each claw pole 9a of the magnetic yokes 9 agrees with a magnetized boundary line (i.e., a boundary between N-pole and S-pole), to obtain a neutral point where the output (voltage) of magnetic sensor 11 becomes zero in the condition that the torsion bar 7 causes no torsion (i.e., when no steering force is applied between the input shaft 5 and the output shaft 6) as shown in FIG. 8B.

The flux collecting rings 10 have a function of collecting magnetic flux generated from the magnetic yokes 9. The flux collecting rings 10 are made of the soft magnetic material which is used for forming the magnetic yokes 9. The flux collecting rings 10 are disposed in the vicinity of the outer periphery of respective magnetic yokes 9. Each of the flux collecting rings 10 is equipped with a flux collecting portion 10a which is configured into a plate shape and provided locally at one portion in the circumferential direction. Two flux collecting portions 10a of the flux collecting rings 10 are opposed to each other.

The magnetic sensor 11 is, for example, a well known Hall IC and inserted between the opposed flux collecting portions 10a of the flux collecting rings 10. The Hall IC is an integrated circuit integrating a Hall element (i.e., a magnetism detecting element) and an amplifying circuit. The magnetic sensor 11 outputs a signal representing the density of magnetic flux generated between the opposed flux collecting portions 10a.

The torque sensor of the above-described embodiment operates in the following manner.

Under the condition that no steering torque is applied to the torsion bar 7, i.e., when the torsion bar 7 causes no torsion or twist displacement, the center of each claw pole 9a of the magnetic yokes 9 agrees with the magnetized boundary line of the multipolar magnet 8 as shown in FIG. 8B. In this case, the amount of magnetic fluxes entering from the N-pole of the multipolar magnet 8 into the claw pole 9a of the magnetic yokes 9 is identical with the amount of magnetic fluxes entering from the S-pole of the multipolar magnet 8 into the claw pole 9a of the magnetic yokes 9. Hence, the magnetic fluxes form a closed loop in each of the magnetic yoke 9A and the magnetic yoke 9B. No magnetic fluxes leak into the air gap between the magnetic yokes 9. The output of magnetic sensor 11 becomes zero.

Figure 8C:
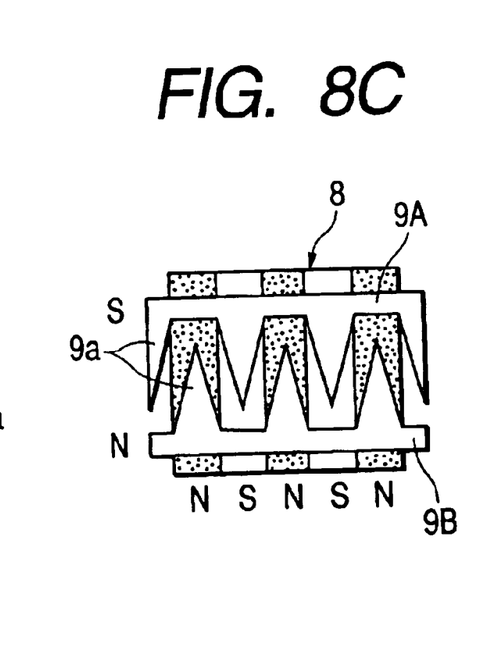

When a steering torque is transmitted to the torsion bar 7 to cause a torsion displacement, the mutual position between the multipolar magnet 8 and the coupled magnetic yokes 9 is changed in the circumferential direction. Accordingly, as shown in FIG. 8A or FIG. 8C, the center of each claw pole 9a of the magnetic yokes 9 deviates from the magnetized boundary line of the multipolar magnet 8 in the circumferential direction. The magnetic fluxes having one polarity increase in one of the magnetic yoke 9A and the magnetic yoke 9B, while the magnetic fluxes having the opposite polarity increase in the other of the magnetic yoke 9A and the magnetic yoke 9B. As a result, positive and negative magnetic fluxes are generated between the magnetic yokes 9. The flux collecting rings 10 attract these positive and negative magnetic fluxes and collect them at their flux collecting portions 10a. The magnetic sensor 11 detects the density of magnetic flux generated between the opposed collecting portions 10a.

According to the torque sensor 1 of the above-described embodiment, one set of magnetic yokes 9 are positioned by the spacer 14 and integrated together with the spacer 14 by resin molding. Thus, it becomes possible to surely retain the coupled condition of the magnetic yokes 9 being thus positioned.

Furthermore, there is no necessity of removing the spacer 14 when the coupled magnetic yokes 9 are integrated by resin molding. Thus, it becomes possible to simplify the dies used for the resin molding. The costs required for the molding dies can be reduced.

The number of projections 14a provided on each end surface of the spacer 14 can be reduced to only one, as long as each projection can perform the above-described positioning function.

Second Embodiment

Figure 10:
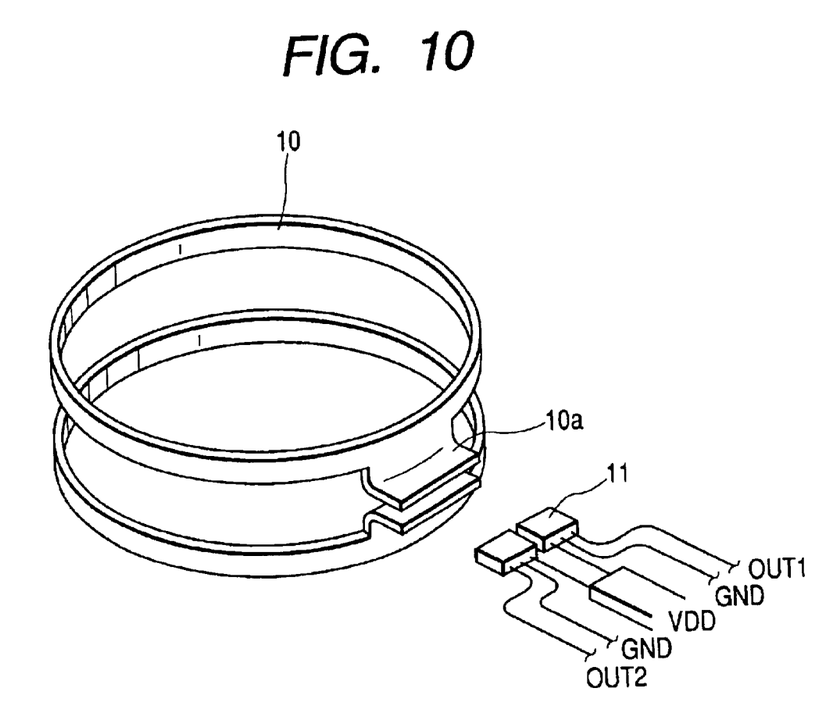
FIG. 10 is a perspective view showing a flux collecting ring and a magnetic sensor in accordance with a second embodiment of the present invention.

FIG. 10 is a perspective view showing flux collecting rings 10 and two magnetic sensors 11 in accordance with another embodiment of the present invention.

Two magnetic sensors 11 are disposed in parallel with each other with respect to the direction of magnetic flux and have magnetism detecting directions mutually opposed by an angular difference of 180°.

Figure 11:
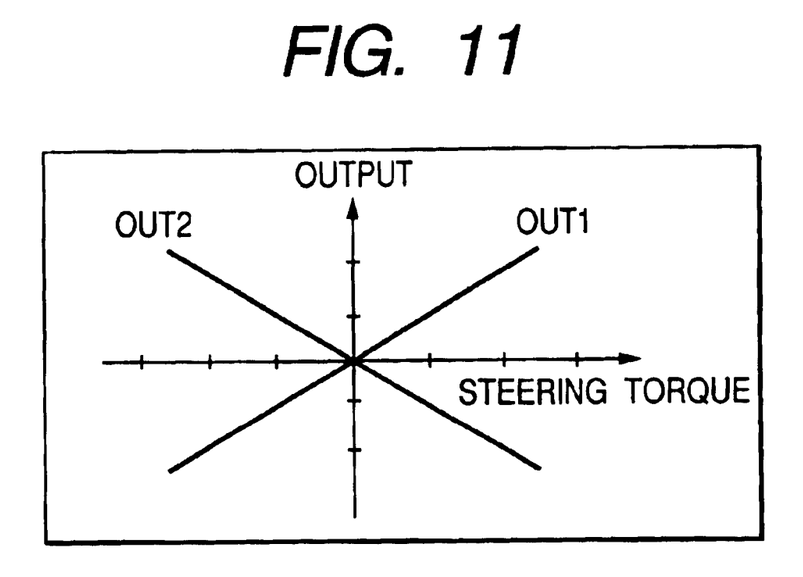
FIG. 11 is a graph showing output characteristics of the magnetic sensor in accordance with the second embodiment of the present invention.

In this case, two magnetic sensors 11 produce symmetric outputs realizing crossing characteristics shown in FIG. 11.

Accordingly, it becomes possible to cancel the temperature drift by taking a difference between the outputs of two magnetic sensors 11. Furthermore, according to this embodiment, the detectable physical amount is doubled. Hence, the detection sensitivity can be improved. The performance of torque sensor 1 can be improved.

Figure 12:
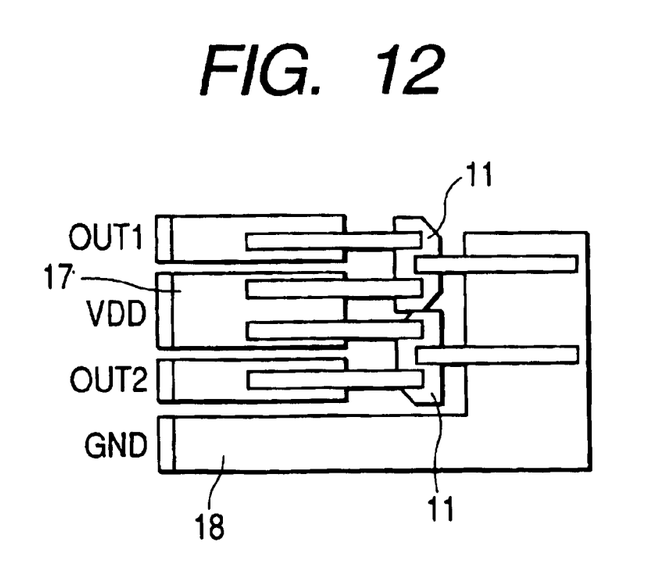
FIG. 12 is a plan view showing an example of terminal connections for the magnetic sensor in accordance with the second embodiment of the resent invention.

Moreover, as shown in FIG. 12, two magnetic sensors 11 can commonly use a power source terminal 17 and an earth terminal 18. Therefore, compared with the case that the wiring is separately provided for respective magnetic sensors 11, it becomes possible to reduce the costs.

What is claimed is:

1. A torque sensor comprising:
a first shaft and a second shaft connected coaxially;
a torsion bar converting a torque applied between said first shaft and said second shaft into a torsion displacement;
a multipolar magnet fixed to said first shaft or to one end of said torsion bar;
one set of magnetic yokes fixed to said second shaft or to the other end of said torsion bar and disposed in a magnetic field generated by said multipolar magnet, said magnetic yokes being opposed to each other via an air gap in an axial direction; and
a magnetic sensor for detecting the density of magnetic flux generated in said air gap,
wherein a non-magnetic spacer is disposed between said magnetic yokes as a means for positioning said one set of magnetic yokes,
said spacer and said one set of magnetic yokes are integrated by resin molding,
said spacer has a single annular body,
said one set of magnetic yokes are assembled to both end surfaces of said single annular body of the spacer, and
said spacer has at least one positioning portion for positioning said one set of magnetic yokes.

2. The torque sensor in accordance with claim 1, wherein said magnetic yokes have a plurality of claw poles disposed in a circumferential direction at equal intervals, said spacer retains said one set of magnetic yokes with a predetermined gap in the axial direction and has at least one projection provided at each axial end surface thereof, and said projection is disposed between the claw poles neighboring with each other in said circumferential direction of said magnetic yoke, thereby positioning said one set of magnetic yokes in the circumferential direction.

3. The torque sensor in accordance with claim 1, wherein said magnetic sensor is constituted by two separated sensors which are disposed in parallel with each other with respect to a direction of magnetic flux and have magnetism detecting directions mutually opposed by an angular difference of 180°.

4. A torque sensor comprising:

a first shaft and a second shaft connected coaxially;

a torsion bar converting a torque applied between said first shaft and said second shaft into a torsion displacement;

a multipolar magnet fixed to said first shaft or to one end of said torsion bar;

one set of magnetic yokes fixed to said second shaft or to the other end of said torsion bar and disposed in a magnetic field generated by said multipolar magnet, said magnetic yokes being opposed to each other via an air gap in an axial direction; and a magnetic sensor for detecting the density of magnetic flux generated in said air gap, wherein a non-magnetic spacer is provided to retain said one set of magnetic yokes with a predetermined gap in the axial direction, said spaced has a single annular body, said one set of magnetic yokes as assembled to axial end surfaces of said single annular body of the spacer, said spacer has at least one projection provided on at least one of said axial end surfaces of said single annular body of the spacer, said projection is disposed between claw poles neighboring with each other in the circumferential direction of said magnetic yoke, and said spacer and said one set of magnetic yokes are integrated by resin molding.

5. The torque sensor in accordance with claim 1, wherein said spacer has at least one projection on each axial end surface of said single annular body of the spacer.

6. The torque sensor in accordance with claim 1, wherein said spacer has two projections on each axial end surface of said single annular body of the spacer.

7. The torque sensor in accordance with claim 1, further comprising a collar fixed to a molding resin integrating said spacer and said one set of magnetic yokes, and said one set of magnetic yokes are fixed to said first shaft or to said second shaft via said collar.

8. The torque sensor in accordance with claim 1, wherein said magnetic sensor is arranged by two separated sensors using a common power source terminal and a common earth terminal.

* * * * *